United States Patent [19]
Greutert

[11] 3,935,112
[45] Jan. 27, 1976

[54] REUSABLE COFFEE FILTER

[75] Inventor: Albert Greutert, Sachseln, Switzerland

[73] Assignee: Interelectric AG, Sachseln, Switzerland

[22] Filed: July 8, 1974

[21] Appl. No.: 486,626

[30] Foreign Application Priority Data
July 12, 1973 Germany............................ 2335506

[52] U.S. Cl................ 210/456; 210/469; 210/474; 210/482; 210/497; 99/306
[51] Int. Cl.²........................................ B01D 35/28
[58] Field of Search............... 99/295, 304, 306 X; 210/314, 315, 316, 455, 456, 464, 469, 470, 474, 476, 477, 482, 489, 497; 426/77, 82, 84

[56] References Cited
UNITED STATES PATENTS

| 969,357 | 9/1910 | Fredrum | 210/315 |
|---|---|---|---|
| 1,070,415 | 8/1913 | Cook | 210/314 |
| 2,948,618 | 8/1960 | Saint | 99/306 |
| 3,080,810 | 3/1963 | Saint | 99/306 |
| 3,610,132 | 10/1971 | Martin et al. | 99/295 |
| 3,695,167 | 10/1972 | Schmidt et al. | 99/306 |
| 3,800,690 | 4/1974 | Molenaar et al. | 99/306 |
| 3,823,656 | 7/1974 | Vander Veken | 99/295 |

*Primary Examiner*—Charles N. Hart
*Assistant Examiner*—F. F. Calvetti
*Attorney, Agent, or Firm*—Frederick E. Bartholy

[57] ABSTRACT

A reusable coffee filter with a pot-shaped hotwater container and a filter strainer adjacent an opening in the bottom of said container. The filter strainer is made of metallic sieve sheets having perforations flaring out in the flow direction. On top of the hotwater container a distribution plate is supportably held which has a plurality of holes distributed over an area corresponding to the vertical projection of the opening of the filter strainer in order to ensure a good wetting and extraction efficiency of the coffee powder.

3 Claims, 2 Drawing Figures

U.S. Patent   Jan. 27, 1976   3,935,112
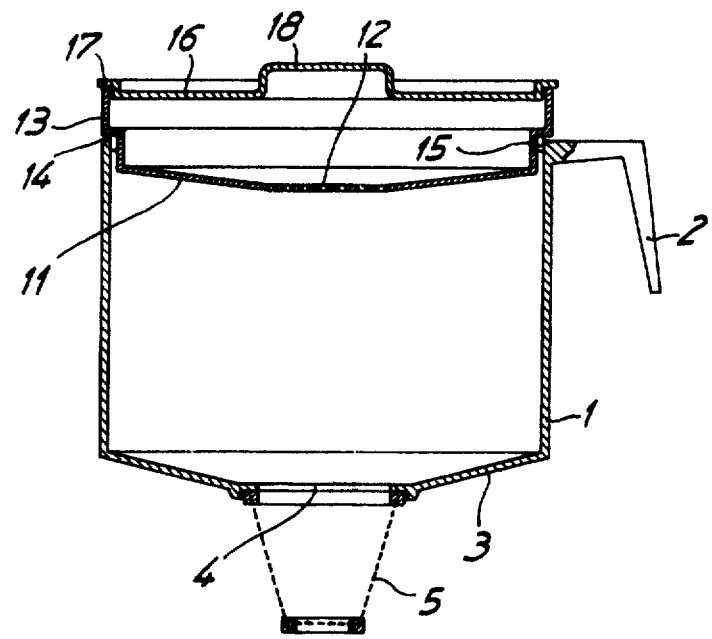
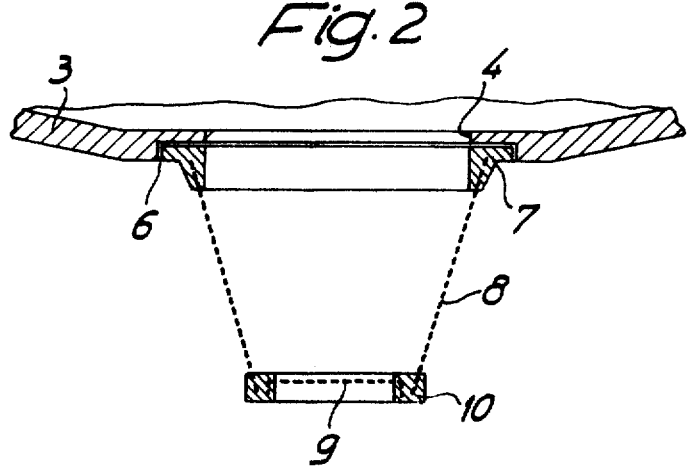

REUSABLE COFFEE FILTER

BACKGROUND OF THE INVENTION

A known reusable coffee filter comprises a pot-shaped hotwater container and a filter strainer with metallic sieve sheets beneath an opening in the bottom of said container. Said sieve sheets have perforations flaring out in the flow direction. The opening in the filter strainer has a smaller diameter than the bottom of the hotwater container.

Such a reusable coffee filter has a water discharge opening with a predetermined flow resistance in the bottom of the hotwater container. It has been found that such a reusable coffee filter does not guarantee a uniform distribution of the coffee powder when pouring the hotwater on it.

SUMMARY OF THE INVENTION

It is an object of the invention to provide a reusable coffee filter which is easy to clean and results in a better wetting of the coffee powder in comparison to known coffee filters.

This is achieved by a distribution plate mounted on top of the hotwater container and having a plurality of openings, which are distributed over an area corresponding to the vertical projection of the opening of the filter strainer. By this means, a unifrom wetting of the coffee powder is attained and relatively few powder particles tend to float.

Preferably, the bottom of the hotwater container is shaped frustro-conically. Thus, after filling the hotwater container the coffee powder particles will settle at the bottom.

Advantageously, the filter strainer is shaped frustro-conically. Such a form is easy to manufacture and ensures an optimal distribution of the coffee powder over the active filter surface.

Preferably, the distribution plate comprises a flat, projecting rim. By this means it is achieved that the water pressure, which exists at the opening of the distribution plate, only varies to a small extent, and therefore the flow rate through the openings is practically kept constant. It is favourable to dimension the rim such that it has a height which is smaller than one third of the height of the hotwater container.

According to a further development, the rim is provided with a shoulder which serves to support the distribution plate non-skidly onto the hotwater container.

In this case the rim may have protrusions to ensure free excape of the air when filling the hotwater container.

Further objects and features of the invention are set forth in the following description.

BRIEF DESCRIPTION OF THE DRAWINGS

FIG. 1 is an axial view of a reusable coffee filter according to the invention.

FIG. 2 is a sectional view of the filter strainer and the adjacent area of the hotwater container.

DESCRIPTION OF A PREFERRED EMBODIMENT

The coffee fi ter illustrated in the Figures comprises a pot-shaped hotwater container 1, contiguous to the top of which is a handle 2, which is integral with the hotwater container.

A frustro-conical bottom 3 of the hotwater container comprises an opening 4, in which a filter strainer 5 is sealingly inserted.

The edge of the opening 4 has a circular recess 6, facing downwardly, in which the upper edge 7 of the filter strainer fits.

The filter strainer is formed frustro-conical and consists of a frusto-conical sieve sheet 8 and a bottom sieve sheet 9, which parts are secured to one another by a plastic ring 10, into which the adjacent edges of sieve sheets 8 and 9, respectively, are embedded. The upper edge of the filter strainer is equally reinforced by a plastic bead.

The upper plastic bead is formed such that it fits in the circular recess and consists of material, which may be sealingly joined to the hotwater container 1, f.i. by ultrasonic welding.

The sieve sheet 8 and the bottom sieve sheet 9 are made galvanoplastically and are gold plated. They are provided with longitudinal slits having a length of between 1 and 3 mm and a width of between 20 and 100 micron, and flaring out in the direction of flow.

A distribution plate 11 is situated on the top of the hotwater container 1 having a number of holes 12 in its central part. The area enclosing the totality of the holes 12 is vertically aligned with the opening 4 in the bottom of the hotwater container and is somewhat smaller than said opening.

The distribution plate is provided with a rim 13 having a recessed shoulder 14, which is adapted to rest on the upper edge of the hotwater container 1. By this means it is achieved that the distribution plate securely fits on the hotwater container.

The height of the rim 13 is considerably smaller than that of the hotwater container 1, namely approximately one-fourth of the same.

Three protrusions 15 are provided at the shoulder, which are equally spaced circumferentially and which are formed so that they maintain a clearance between the rim 13 and the shoulder 14 on the one hand and the wall of the hotwater container 1 on the other hand.

A cover 16 is supported on the edge of the distribution plate. The cover 16 is furnished with a flange 17 which prevents that the cover from sliding down on the distribution plate.

In its central part the cover 16 has a cylindrical domelike handle 18 serving as a grip when in the position shown in FIG. 1, whereas in its reversed position it serves as a deposit plate for the coffee filter, the recess of said handle 18 being adapted to receive the plastic ring 10 of the filter strainer.

When using the coffee filter, the filter strainer 5 is filled with the desired amount of coffee powder and thereafter the distribution plate 11 is put onto the hotwater container. Boiling water is poured onto the distribution plate and drops through the holes 12 directly onto the coffee powder contained in the filter strainer 5. The flow resistance of the holes 12 is such that water contained in the chamber defined by the distribution plate 11 and the cover 16 will pass into the hotwater container 1 within 10 to 30 seconds.

After pouring in the total amount of water, the cover 16 is put on in order to avoid cooling off which may be caused by emanating steam.

It has been found that such a reusable coffee filter obtains a good wetting of the coffee powder, which does not adhere to air bubbles and therefore does not tend to float. Moreover, the coffee filter is easy to clean and simple to manufacture.

I claim:
1. A reusable coffee filter comprising:
   a. a pot-shaped hot water container having a bottom wall defining an opening of a diameter smaller than the diameter of the hot water container;
   b. a frustro-conical filter strainer made of metallic sieve sheets depending from the opening in said pot-shaped hot water container, the bottom of said frustro-conical strainer comprising a horizontal sieve sheet; and
   c. a water distribution pan supported within said hot water container by means located at the top thereof, said pan having a bottom wall containing a large number of small holes distributed over a portion of the bottom wall vertically aligned with the opening in said hot water container and somewhat smaller in extent than that opening.

2. A coffee filter in accordance with claim 1 wherein said distribution pan has a rim extending over the top of said container, the axial dimension of said rim being less than one-third the height of said container.

3. A coffee filter in accordance with claim 1, wherein the small holes in said distribution pan are so dimensioned as to have a flow resistance corresponding to an efflux time of between 10 and 30 seconds for the filling of said container.

* * * * *